Nov. 17, 1970  R. A. DEUELL ET AL  3,540,180
ARTICLE LOADING APPARATUS
Filed June 19, 1968  5 Sheets-Sheet 1

INVENTORS
ROBERT A. DEUELL
GUENTHER W. MAY
ALFRED E. OLDAKER
THOMAS J. RAJAC
CLAUDE O. SAGE

Frank C. Leach Jr.
BY  ATTORNEY

United States Patent Office 3,540,180
Patented Nov. 17, 1970

3,540,180
ARTICLE LOADING APPARATUS

Robert A. Deuell, Wappingers, Guenther W. May and Alfred E. Oldaker, Poughkeepsie, Thomas J. Rajac, Wappingers Falls, and Claude O. Sage, Canada Lake, N.Y., assignors to International Business Machines Corporation, Armonk, N.Y., a corporation of New York
Filed June 19, 1968, Ser. No. 738,194
Int. Cl. B65b 57/10, 35/32
U.S. Cl. 53—59
28 Claims

ABSTRACT OF THE DISCLOSURE

A tray has a plurality of substantially parallel channels therein adapted to be filled in sequence with articles. As each channel is aligned with the source of the articles, the articles are continuously supplied to the channel until the channel is substantially filled. However, complete filling of the channel is prevented by means disposed in the end of the channel remote from the source of supply. After the remainder of the channel has been filled and a sufficient number of articles are disposed adjacent the other end of the channel to fill the portion of the channel that is still unfilled, the next of the articles is restrained against movement to prevent further flow of articles to the channel. Then, the preventing means at the other end of the channel is removed to allow the channel to be completely filled. Upon complete filling of the channel, the tray is moved to present the next channel for loading from the source.

---

In the automatic production of many similarly shaped articles of relatively small size such as electronic modular circuits, for example, the articles must be transported from one work station or area to another. Various types of trays have been utilized for transporting or carrying a number of such articles.

When the trays are advanced to a work station, it is necessary to unload the trays to perform work on the articles at the work station. After the work has been performed, each of the trays must again be loaded with the articles to transport the articles to the next work station.

The tray may comprise a plurality of substantially parallel channels with each of the channels adapted to hold a number, such as forty, for example, of the articles. Thus, a tray having five channels would be capable of transporting two hundred articles from one work station or area to the next. If the loading of the trays is too slow, this results in the production line having its speed of operation reduced. Therefore, it is desirable to be able to load each of the trays as rapidly as possible.

It has previously been suggested to load each of the trays by gravity through inclining both the conveying means from the supply source and the tray. In one prior means for loading the tray with articles by gravity, each of the articles is arrested or stopped during its fall or travel from the supply source to the channel in the tray by a toggle gate. The toggle gate holds the article until a photocell, which controls the toggle gate and is disposed adjacent the top of the channel being loaded, determines that there is space in the channel for another article. When this is determined, the toggle gate is actuated to release the single article being held; the toggle gate then restrains or arrests the next of the articles until another signal from the photocell indicates that there is space for the next of the articles.

This type of loading system is limited in its rate of loading due to the period of motion of the toggle gate. Thus, it is exceedingly difficult to achieve a loading rate greater than six articles per second with the presently available equipment.

The present invention satisfactorily overcomes the foregoing problem by permitting relatively rapid loading of each channel in the tray. Thus, the articles are permitted to fall or flow uninterruptedly from the supply source to the channel until the channel is substantially filled. Blocking means, which is located at the end of the channel remote from the end receiving the articles, is positioned to prevent complete filling of the channel. The present invention contemplates storing sufficient articles adjacent the upper end of the channel to fill the space, which the blocking means prevents from being filled initially, after further flow of the articles from the supply source is arrested or stopped.

Thus, the present invention permits substantially uninterrupted filling of the channel of the tray. As a result, a loading rate substantially greater thn six articles per second is easily achieved when utilizing the loading apparatus of the present invention.

An object of this invention is to provide an apparatus to load articles for transport.

Another object of this invention is to provide an apparatus for loading articles at a relatively rapid rate.

The foregoing and other objects, features, and advantages of the invention will be more apparent from the following more particular description of the preferred embodiments of the invention as illustrated in the accompanying drawings.

Figures 1, 2:
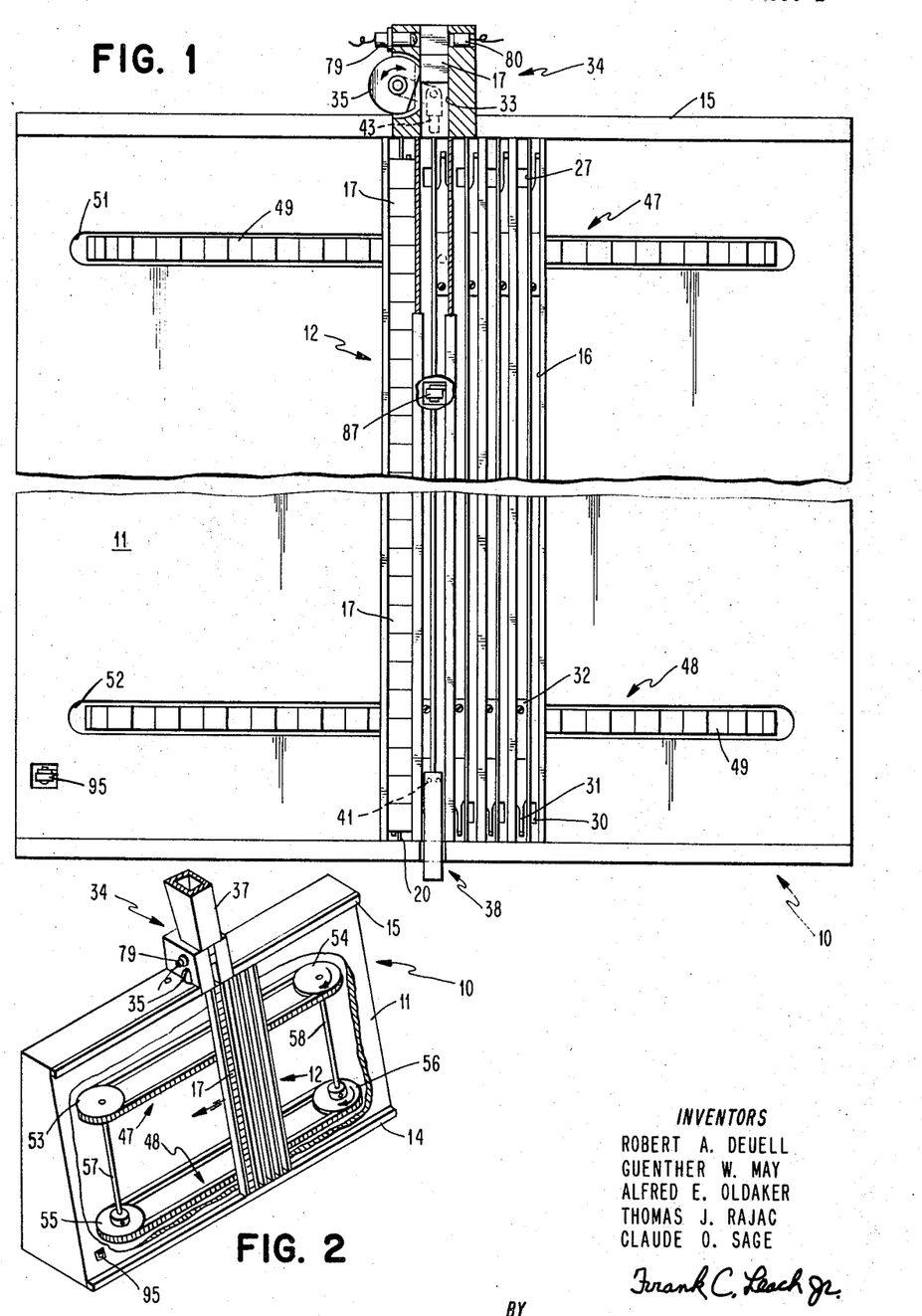
FIG. 1 is a front elevational view of the article loading apparatus of the present invention with one tray mounted thereon.
FIG. 2 is a perspective view of the article loading apparatus of FIG. 1 with parts broken away to illustrate the indexing mechanism.

Referring to the drawings and particularly in FIGS. 1 and 2, there is shown the article loading apparatus of the present invention including a support 10 having an inclined support wall 11 upon which a tray 12 is supported. It should be understood that a plurality of the trays 12 may be disposed on the wall 11.

The support 10 has a lower guide 14 and an upper guide 15 between which the tray 12 is supported and guided in its movement along the support wall 11. The bottom of the tray 12 rests upon the lower guide 14.

Figure 3:
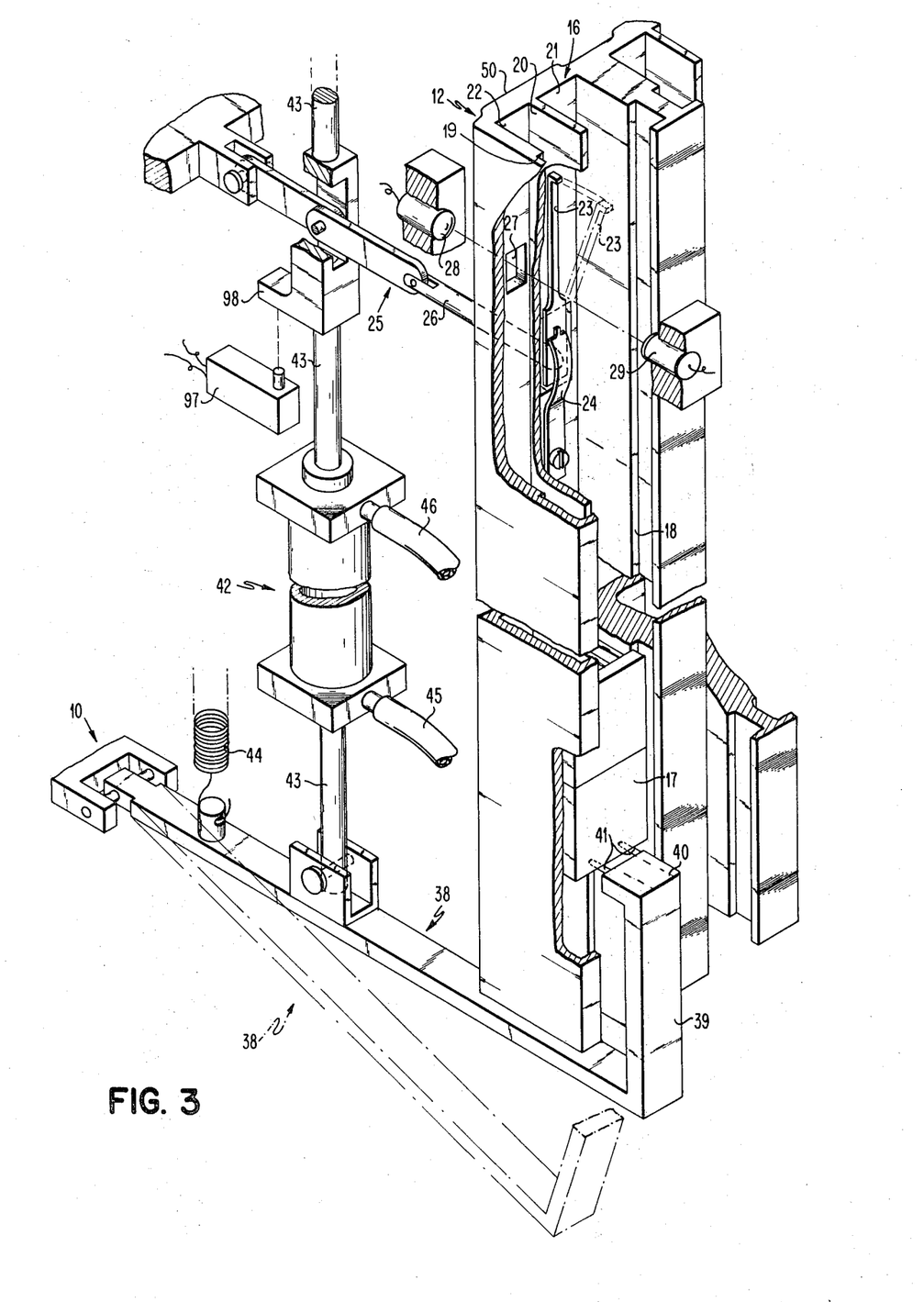
FIG. 3 is an enlarged perspective view of a portion of the apparatus of FIG. 1 and illustrating blocking means for preventing complete loading of the channel in the tray initially and spring depressing means to permit loading of the channel in the tray.
Figure 4:
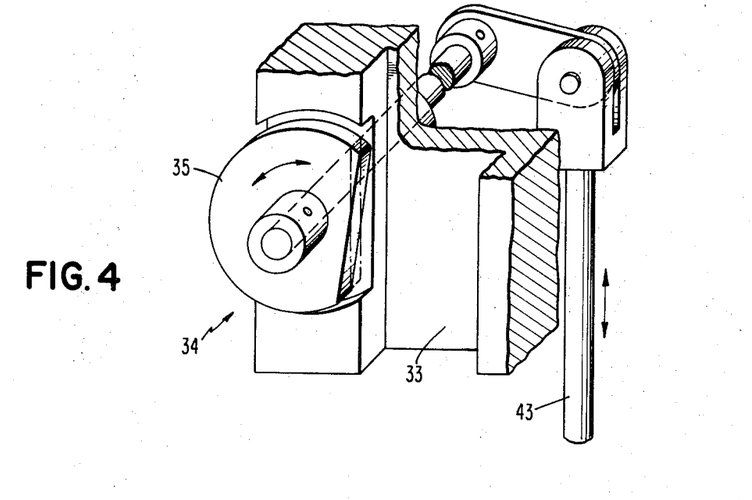
FIG. 4 is an enlarged perspective view illustrating the connection for actuating the toggle gate.

The tray 12 has a plurality of substantially parallel channels 16 formed therein to receive articles 17 for transport by the tray 12. As shown in FIG. 3, the articles 17, which may be substrates having pins extending downwardly therefrom, for example, are supported on ledges 18 and 19, which are on opposite sides of each of the channels 16. Thus, the pins, which extend downwardly from the substrates, may freely be disposed within the channels 16.

Each of the channels 16 is divided by a longitudinally extending member 20 into two parallel portions 21 and 22. The member 20 permits the portion 21 of each of the channels 16 to be utilized for retaining springs to hold the articles 17 within the channel 16 while the other portion 22 permits utilization of openings in the channel 16 to determine when the channel 16 has a predetermined number of the articles therein.

As shown in FIG. 3, a retaining spring 23 is disposed within the portion 21 of the channel 16. The retaining spring 23 is urged to its dotted line position by a second spring 24 so that the retaining spring 23 retains or holds the articles 17 within the channel 16 when the spring 23 is in its dotted line position.

In order to fill the channel 16, it is necessary for the spring 23 to be depressed to the solid line position during loading of the tray 12. Otherwise, when the spring 23 is disposed in the dotted line position, it would prevent any loading of the articles 17 into the channel 16.

Accordingly, when a spring depressing means 25 is in the position of FIG. 3, a link 26 of the spring depressing means 25 extends through an opening in the bottom of the tray 12 and an opening in the retaining spring 23 to push the actuating spring 24 sufficiently away from the retaining spring 23 to allow the retaining spring 23 to be moved to the solid line position of FIG. 3. In this position, the channel 16 may be filled with the articles 17.

An opening 27 is formed in the bottom wall of the tray 12 for communication with the portion 22, which is formed in the channel 16 by the longitudinal member 20. With the tray 12 positioned on the support 10 as shown in FIGS. 1 and 2, the opening 27 is disposed between a photocell 28 and a lamp 29 and in alignment therewith. Thus, when one of the articles 17 is not blocking the opening 27, the photocell 28 is energized by the lamp 29.

As shown in FIG. 1, the other end of each of the channels 16 has a similar arrangement of an opening 30 in the portion 21, rather than the portion 22, of the channel 16 and a retaining spring 31 along with an actuating spring 32 in the portion 22, rather than the portion 21. Thus, the tray 12 may be arranged with either end at the top to receive the articles 17 and either end at the bottom.

When the tray 12 is disposed as shown in FIGS. 1 and 2, one of the channels 16 communicates at its upper end with a passage 33 in a gate housing 34, which is mounted on the support 10. The gate housing 34 has a toggle gate 35 pivotally mounted therein and adapted to block the passage 33 to prevent the flow of articles 17 therethrough when the toggle gate 35 is in a blocking position. The toggle gate 35 preferably has a non-abrasive insert of a suitable material such as plastic, for example, on one end to prevent damage to any of the articles 17 that are engaged by the toggle gate 35 to prevent the articles 17 from flowing into the channel 16 in the tray 12.

The passage 33 in the gate housing 34 is connected to a housing 37 (see FIG. 2), which may be the source of the articles 17 or may be connected to the source. Thus, a supply of the articles 17 is continuously available at the top of the passage 33.

When the tray 12 is disposed so that one of the channels 16 may receive the articles 17 from the housing 37 through the passage 33 in the gate housing 34, a blocking lever 38, which is pivotally mounted on the support 10, must be disposed in the solid line position of FIG. 3 to block the lower end of the channel 16 in the tray 12. The blocking member 38 includes an arm 39, which is disposed parallel to the axis of the channel 16, and a projection 40 on the end of the arm 39 for disposition within the channel 16.

The lower end of the projection 40 has a pair of pins 41 extending therefrom for disposition in the channel 16 sufficiently to prevent the article 17 from moving down the channel 16 beyond the pins 41. The pins 41 are positioned so that the length of the space between the pins and the retaining end of the retaining spring 31 is equal to the length of space between just above the top of the opening 27 in the tray 12 and the toggle gate 35 in the gate housing 34. Thus, when the toggle gate 35 is blocking the passage 33 in the gate housing 34, the number of the articles 17 stored beneath the toggle gate 35 and above the opening 27 in the tray 12 with the channel 16 filled except for the blocking lever 38 is equal in number to the articles that will fill the space in the channel 16 block by the blocking lever 38. Accordingly, to properly fill each of the channels 16 in the tray 12, the spring depressing means 25, the toggle gate 35, and the blocking lever 38 must be operated in cooperation with each other in a specific sequence.

The spring depressing means 25, the toggle gate 35, and the blocking lever 38 have their positions regulated by a control cylinder 42, which is preferably an air cylinder. The control cylinder 42 has the lower end of its piston rod 43 connected to the blocking level 38, which is urged to its solid line position by a spring 44 having one end fixedly secured to the support 10 and its other end fixed to the lever 38. The piston rod 43 also is connected to the spring depressing means 25 and to the toggle gate 35. Thus, when the actuating fluid, which is air when the control cylinder is an air cylinder, is introduced into the control cylinder 42 through a hose 45 and removed through a hose 46, the piston rod 43 is moved upwardly. This is when one of the channels 16 in the tray 12 is to be loaded with the articles 17.

Because of the pivotal connection of the spring depressing means 25 to the piston rod 43, the retaining spring 23 is moved to the solid line position of FIG. 3 before the blocking lever 38 is moved to its solid line position of FIG. 3. Then, the toggle gate 35 is moved to the position in which it does not block the passage 33 whereby the articles 17 may flow from the gate housing 34 into the channel 16 in the tray 12.

The reverse arrangement exists when the channel 16 has been filled except for the space in the channel 16 blocked by the blocking level 38. Then, the toggle gate 35 is first moved to block the passage 33, next the blocking lever 38 is moved to its dotted line position of FIG. 3 against the force of the spring 44, and finally the spring depressing means 25 is moved to allow the actuating spring 24 to move the retaining spring 23 to the dotted line position of FIG. 3. This is accomplished by supplying fluid to the control cylinder 42 through the hose 46 and removing fluid therefrom through the hose 45. This moves the piston rod 43 downwardly in FIG. 3.

Thus, by first moving the toggle gate 35 to block the passage 33, this insures that no more of the articles 17 from the source can flow through the passage 33 in the gate housing 34 to the channel 16. However, the articles 17 stored within the gate housing 34 between the toggle gate 35 and above the opening 27 in the tray 12 will fall into the channel 16 when the blocking lever 38 is moved to its dotted line position of FIG. 3 against the force of the spring 44. Thus, by the time that the spring depressing means 25 allows the retaining spring 23 to be moved to the dotted line position to hold or retain the articles 17 within the tray 12, the articles 17, which were disposed within the gate housing passage 33 beneath the toggle gate 35 and in the channel 16 above the top of the opening 27 in the tray 12, will have fallen by gravity into the channel 16 beneath the retaining end of the retaining spring 23.

The tray 12 is advanced from right to left in FIGS. 1 and 2 by a pair of chains 47 and 48, which have projections 49 thereon for cooperation with teeth 50 (see FIG. 3) on the back of the tray 12. The projections 49 on the chains 47 and 48 extend upwardly through parallel slots 51 and 52 in the support wall 11. Therefore, accurate indexing of the tray 12 may be obtained through controlling the drive of the chains 47 and 48.

The chain 47 passes around sprockets 53 and 54 while the chain 48 passes around sprockets 55 and 56. The sprockets 53 and 55 are mounted on a common shaft 57 while the sprockets 54 and 56 are mounted on a common shaft 58. The shafts 57 and 58 are rotatably mounted on the support 10.

The shaft 58 has a ratchet wheel 59 (see FIG. 5) fixedly mounted thereon. A pawl 60 is secured to one end of a piston rod 61 of an index cylinder 62, which is preferably an air cylinder, for cooperation with the teeth of the ratchet wheel 59. Thus, every time that the piston rod 61 is moved to the left in FIG. 5 through supplying fluid to the index cylinder 62 by a hose 63 and withdrawing fluid from the cylinder 62 by a hose 64, the shaft 58 is rotated to index the tray 12 to the left. Therefore, by controlling actuation of the pawl 60, indexing of the tray 12 is regulated.

Figure 5:
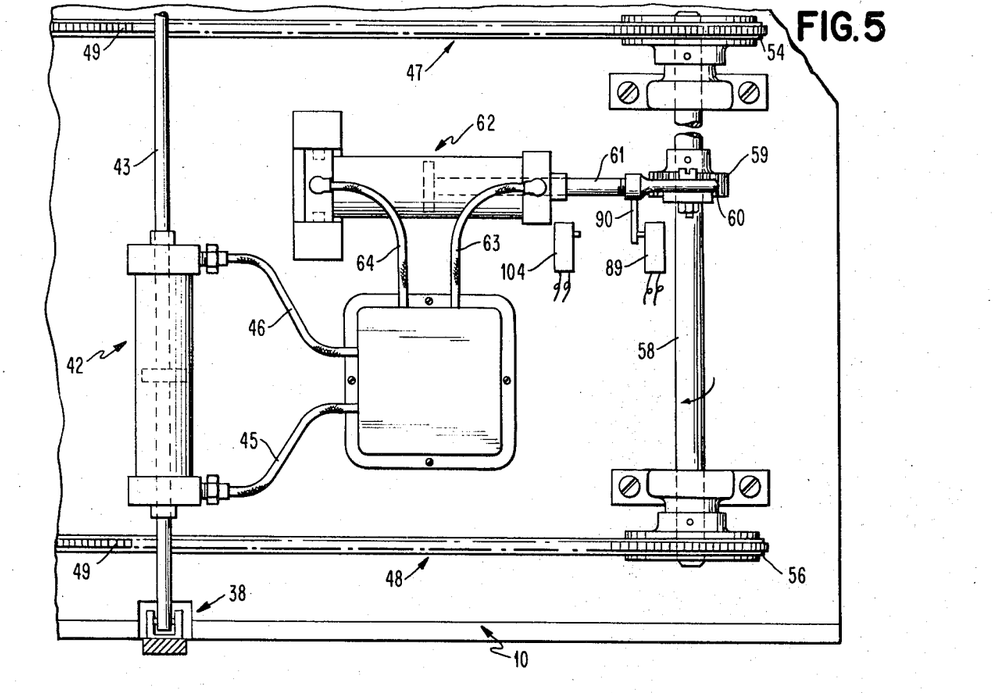
FIG. 5 is an elevational view of the apparatus of FIG. 1 with the support wall removed and showing the relation between the indexing mechanism and its control and the control for the blocking means, spring depressing means, and toggle gate.
Figure 6:
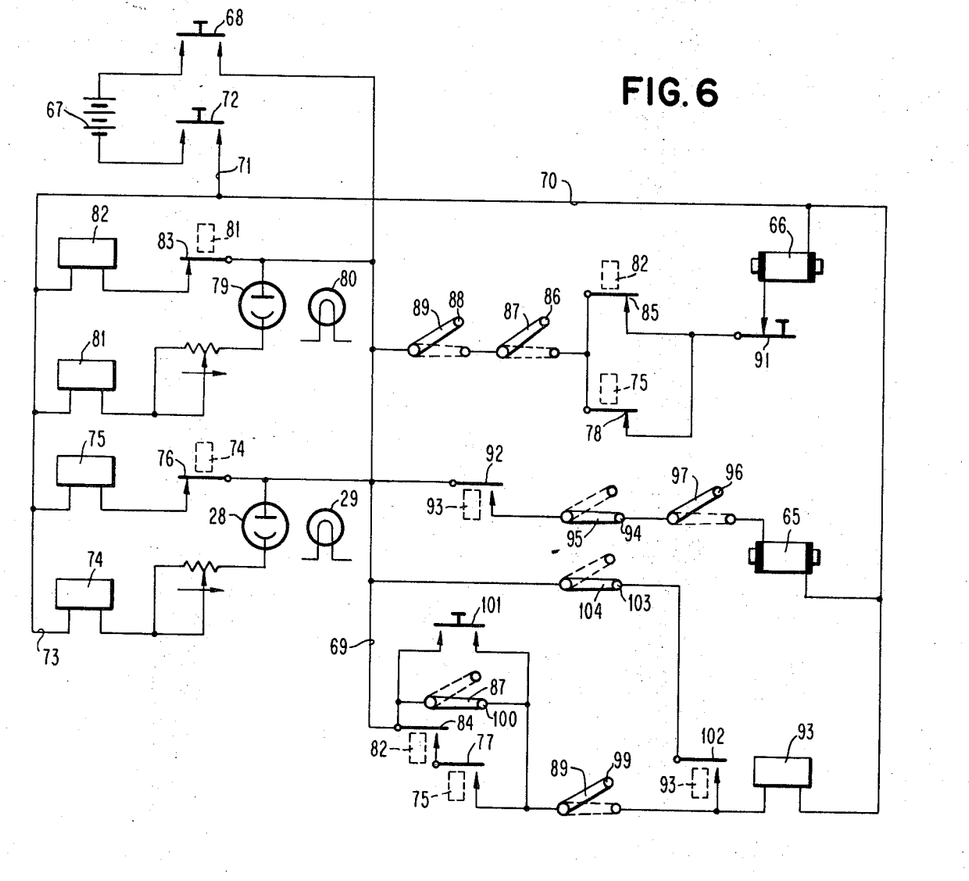
FIG. 6 is a schematic wiring diagram for automatically controlling the apparatus of the present invention when utilizing the pneumatic control structure of FIG. 5.

A circuit for controlling the operation of the article loading apparatus of the embodiment of FIGS. 1–5 is shown in FIG. 6. The circuit includes a solenoid 65, which controls the flow of fluid to the index cylinder 62 to allow the piston rod 61 of the index cylinder 62 to be moved to the left as viewed in FIG. 5. As a result, each energization of the solenoid 65 advances the tray 12 a predetermined distance from right to left in FIGS. 1 and 2. This predetermined distance is the width of one of the channels 16 in the tray 12.

The control circuit also includes a solenoid 66, which regulates the operation of the control cylinder 42. Thus, whenever the solenoid 66 is energized, fluid is supplied to the cylinder 42 through the hose 45 to move the toggle gate 35 to its open position, the retaining spring 23 to its solid line position of FIG. 3, and the blocking lever 38 to its solid line position of FIG. 3.

The control circuit includes a DC voltage source 67 such as a battery, for example, connected through a contact 68 of an On-Off switch to a positive lead 69, which is connected to one side of the solenoids 65 and 66 through switches.

The other side of each of the solenoids 65 and 66 is connected through leads 70 and 71 and a second contact 72 of the On-Off switch to the negative side of the DC source 67. Accordingly, whenever the various switches in the circuit to the solenoid 65 or the solenoid 66 are closed, the solenoid 65 or 66 is energized.

The photocell 28 is connected between the positive lead 69 and a negative lead 73, which is connected to the negative lead 71, through a relay 74. Thus, whenever the photocell 28 receives light from the lamp 29, its resistance is lowered sufficiently to permit picking of the relay 74.

A timer 75 is connected in parallel with the relay 74 and the photocell 28 through a contact 76 of the relay 74. One suitable example of the timer 75 is a 48 volt timer made by Potter & Brumfield.

As long as the relay 74 is picked, the contact 76 is held in an open position whereby the timer 75 is not activated. However, as soon as the relay 74 is de energized due to the photocell 28 not receiving light from the lamp 29 because one of the articles 17 is blocking the opening 27, the relay 74 opens whereby the contact 76 closes to start the timer 75. The timer 75 must be activated for a predetermined period of time before its normally open contact 77 is moved to a closed position and its normally closed contact 78, which is in the position of the circuit connecting the lead 69 to the solenoid 66, is moved to an open position.

Thus, while each of the articles 17 momentarily blocks the light from the lamp 29 to the photocell 28 as the article 17 moves down the channel 16 from the passage 33 in the gate housing 34, there is not sufficient blocking of the lamp 29 to allow the timer 75 to be actuated for a sufficient period of time to move the normally open contact 77 to a closed position and the normally closed contact 78 to an open position. Thus, the only time that the timer 75 is activated for the predetermined period of time whereby the normally open contact 77 closes and the normally closed contact 78 opens is when the channel 16 is filled with the articles 17 except for the portion of the channel 16 that is blocked by the pins 41 on the blocking lever 38.

As shown in FIG. 1, the opening 27 is so disposed that one more of the articles 17 may be disposed within the channel 16 above the article 17 blocking the opening 27. Another of the articles 17 is capable of being stored within the passage 33 between the toggle gate 35 and the top of the tray 12. These two articles 17 are the two articles that fill the channel 16 when the blocking lever 38 is moved from its blocking position to allow the remainder of the articles 17 within the channel 16 to move downwardly. Thus, the length of the space above the opening 27 in the channel 16 and beneath the toggle gate 35 in the gate housing passage 33 is equal to the length of the space in the channel 16 that is blocked by the pins 41 of the blocking lever 38.

Accordingly, when the opening 27 is blocked by the article 17 in the channel 16 not being capable of moving downwardly, the time 75 is activated for the predetermined period. As a result, the normally open contact 77 is closed and the normally closed contact 78 is open.

The article loading apparatus of the present invention has a second photocell 79 mounted in the gate housing 34. A lamp 80, which also is mounted in the gate housing 34, directs its light across the passage 33 in the gate housing 34. Accordingly, the beam of light from the lamp 80 is blocked out during passage of each of the articles 17 from the housing 37 through the passage 33 to the channel 16 in the tray 12.

As shown in FIG. 6, the photocell 79 is connected between the positive lead 69 and the negative lead 73 through a relay 81. Thus, whenever the photocell 79 receives light from the lamp 80, its resistance is lowered sufficiently to permit picking of the relay 81.

A timer 82 is connected in parallel with the relay 81 and the photocell 79 through a contact 83 of the relay 81. The timer 82 is preferably the same type as the timer 75.

As long as the relay 81 is picked, the contact 83 remains open whereby the timer 82 is not activated. However, as soon as the relay 81 is de-energized due to the photocell 79 not receiving light from the lamp 80 because one of the articles 17 is blocking the light from the lamp 80 to the photocell 79, the relay 81 de-energizes whereby the contact 83 closes to start the timer 82. The timer 82 must be activated for a predetermined period of time before its normally open contact 84 is moved to a closed position and its normally closed contact 85, which is in the portion of the circuit connecting the lead 69 to the solenoid 66, is moved to an open position.

Thus, the normally open contact 84 and the normally closed contact 85 of the timer 82 will not have their positions changed as long as the articles 17 are flowing through the passage 33 into the channel 16 in the tray 12. This is because the short periods of time in which the light from the lamp 80 is blocked from the photocell 79 by one of the moving articles 17 is not sufficient to cause the timer 82 to close the normally open contact 84 and to open the normally closed contact 85.

Accordingly, the light from the lamp 80 is blocked for a sufficient period of time to allow the normally open contact 84 of the timer 82 to close and the normally closed contact 85 of the contact 82 to open only when the channel 16 is completely filled with the articles 17 except for the portion of the channel blocked by the pins 41 of the blocking lever 38 and the passage 33 in the gate housing 34 is completely filled with the articles 17. Thus, the contacts 77 and 78 of the timer 75 are activated before the contacts 84 and 85 of the timer 82. This is because the light from the lamp 29 is blocked sooner than the light from the lamp 80.

When light from both the lamp 80 and the lamp 29 is blocked, this indicates that the channel 16 is filled with the articles 17 except for the portion blocked by the pins 41 of the blocking lever 38 and that the passage 33 in the gate housing 34 is completely filled. Thus, no more of the articles 17 can now be supplied from the housing 37.

Accordingly, it is now desired to actuate the control cylinder 42 so that the toggle gate 35 is moved to block the passage 33 and the blocking lever 38 is removed from blocking the lower end of the channel 16 to allow complete filling of the channel 16 with the articles 17. (These additional articles are the articles 17 between the toggle gate 35 and the opening 27 in the tray 12.) After complete filling of the channel 16 has occurred, it is desired that the retaining spring 23 be moved to the dotted line position of FIG. 3 to retain the articles 17 within the filled channel 16.

Therefore, when the photocells 28 and 79 no longer receive light from the lamps 29 and 80, respectively, it is desired to de-energize the solenoid 66. This will produce the desired movement of the control cylinder 42. Since the normally closed contact 78 of the timer 75 opens after the light from the lamp 29 has been blocked from the photocell 28 for a predetermined period of time and the normally open contact 85 of the timer 82 opens after the photocell 79 has not received light from the lamp 80 for a predetermined period of time, current flow to the solenoid 66 is interrupted by both of the parallel contacts 78 and 85 opening.

During loading of one of the channels 16 in the tray 12, a normally open contact 86 of a loading position switch 87 (see FIG. 1), which is actuated when one of the channels 16 of the tray 12 is at the loading position, is closed due to actuation of the switch 87. The contact 86 is disposed in the circuit from the positive lead 69 to the solenoid 66.

Likewise, a normally open contact 88 of a home index switch 89 (see FIG. 5), which is actuated when an arm 90 on the piston rod 61 of the index cylinder 62 is in its home position whereby no indexing is occurring, is held closed due to actuation of the home index switch 89. The contact 88 also is disposed in the circuit from the positive lead 69 to the solenoid 66.

Thus, during loading of one of the channels 16 with the contacts 86 and 88 closed and a contact 91 of a manual index switch normally closed, a circuit is completed through the solenoid 66 as long as the contacts 78 and 85 remain closed. Accordingly, the piston rod 43 of the control cylinder 42 is in its uppermost position as long as the solenoid 66 is energized.

Therefore, when the solenoid 66 is de-energized, the piston rod 43 of the control cylinder 42 moves downwardly to the position in which the pins 41 of the blocking lever 38 do not block the channel 16 (this is the dotted line position of the blocking lever 38 in FIG. 3), the spring depressing means 25 pulls the link 26 away from engagement with the actuating spring 24 whereby the retaining spring 23 moves to the position in which it retains the articles 17 within the channel 16 (this is the dotted line position of the retaining spring 23 in FIG. 3), and the toggle gate 35 moves to the blocking position. The sequence of operations due to the solenoid 66 being de-energized is that the toggle gate 35 is first moved to block the passage 33 when the piston rod 43 starts downwardly. Then, the blocking lever 38 is moved to the dotted line position of FIG. 3 to allow the articles 17 to fill the remainder of the channel 16 until the lowermost of the articles 17 engages the retaining spring 31. The withdrawal of the link 26 of the spring depressing means 25 is the final actuation due to the piston rod 43 moving downwardly. This results in the retaining spring 23 moving to the dotted line position of FIG. 3 after the two articles 17, which have been stored above the article 17 blocking the opening 27 in the channel 16 and beneath the toggle gate 35 in the gate housing passage 33, are within the channel 16 below the retaining tip or end of the retaining spring 23.

The index cylinder 62 has fluid supplied thereto to retract the piston rod 61 into the index cylinder 62 when the solenoid 65 is picked. The index solenoid 65 is connected to the lead 69 through a normally open contact 92 of a relay 93, a normally closed contact 94 of a switch 95 (see FIG. 1) and a normally open contact 96 of a switch 97 (see FIG. 3).

The switch 95, which is disposed at the left end of the support 10, is only actuated when the support 10 is filled with the trays 12 from the loading position to the left end of the support 10. Thus, the normally closed contact 94 of the switch 95 is moved to its open position only when no further advancement of the trays 12 can occur without one of the trays 12 being pushed off of the support 10.

The switch 97 is actuated by an arm 98 on the piston rod 43 when the piston rod 43 is in its lowermost position. Thus, the index solenoid 65 cannot be picked unless the blocking lever 38 is out of its blocking position, the retaining spring 23 is retaining the articles 17 within the channel 16, and the toggle gate 35 is blocking the passage 33 in the gate housing 34. This is necessary to insure that there is no advancement of the tray 12 when the blocking lever 38 would have the pins 41 in a position in which they would prevent movement of the tray 12 or be damaged by such movement, the retaining spring 23 is in a position in which it would not retain the articles 17 within the channel 16, and the toggle gate 35 is in a position in which the articles 17 could continue to flow into the channel 16. Therefore, the contact 96 of the switch 97 is closed only when the piston rod 43 is in its lowermost position after loading of one of the channels 16 in the tray 12 has been completed.

Thus, if loading of the channel 16 has been completed so that the piston rod 43 of the gate cylinder 42 is in the position of FIG. 3 (this is the lowermost position of the rod 43), and the tray 12 has not actuated the switch 95, it is only necessary for the relay 93 to be energized to close the normally open contact 92 to cause energization of the index solenoid 65 whereby the tray 12 may be advanced from right to left as viewed in FIG. 1.

Accordingly, it is only necessary for the relay 93 to be picked to cause advancement of the tray 12 from right to left as viewed in FIG. 1. The relay 93 is connected to the positive lead 69 through switches disposed in three different parallel circuits.

The three parallel circuits can cause picking of the relay 93 only when a normally open contact 99 of the home index switch 89 is closed due to the switch 89 being engaged by the arm 90 on the piston rod 61 of the index cylinder 62 as show in FIG. 5. Thus, it is necessary for the index cylinder 62 to be in its home position, as shown in FIG. 5, for any of the three parallel circuits to cause energization of the relay 93.

With the contact 99 closed when the index cylinder 62 is in the position of FIG. 5, the relay 93 is picked if a normally closed contact 100 of the loading position switch 87 is closed. The contact 100 is opened only when one of the trays 12 has one of its channels 16 at the loading position. When this occurs, the switch 87 is actuated to open the normally closed contact 100. Thus, when one of the channels 16 is disposed at the loading position, energization of the relay 93 cannot occur through the normally closed switch 100 since it is opened.

However, since the normally open contact 77 of the timer 75 and the normally open contact 84 of the timer 82 are closed after loading of the channel 16 is completed, the circuit through the contacts 77 and 84 can cause energization of the relay 93 whenever the tray 12 is at the loading position.

Therefore, picking of the relay 93 occurs through the normally closed contact 100 when one of the trays 12 is not disposed at the loading position. However, as soon as one of the trays 12 is at the loading position, further energization of the relay 93 can occur only at the end of loading of each of the channels 16 in the tray 12. Thus, the circuit through the contact 100 causes the tray 12 to be moved from the right side to the loading position. However, as soon as one of the trays 12 is at the loading position, further indexing or advancement of the tray 12 is controlled by the photocells 28 and 79 indicating that loading has been completed.

The third parallel circuit includes a contact 101 of the manual index switch, which also includes the contact 91. The contact 101 is closed only when it is desired to manually index the tray 12.

When the relay 93 is energized, the index solenoid 65 is energized provided that the contacts 94 and 96 are closed as previously mentioned. As soon as the piston rod 61 starts to retract into the index cylinder 62, the arm 90 is moved away from the switch 89 whereby the contacts 88 and 99 open since the arm 90 is no longer engaging the switch 89. This not only breaks the circuit through the contact 99 to the relay 3 but also breaks the circuit through the contact 88 to the solenoid 66. The opening of the contact 88 insures that there can be no actuation of the control cylinder 42 during indexing.

However, opening of the contact 99 does not cause de-energization of the relay 93 whereby the index solenoid 65 would be de-energized. Instead, the relay 93 remains picked through a hold circuit comprising a contact 102 of the relay 93 and a normally closed contact 103 of a switch 104 (see FIG. 5), which is actuated by the arm 90 on the piston rod 61 of the index cylinder 62 only when the rod 61 has been fully retracted to advance the chains 47 and 48 the predetermined amount.

Thus, the hold circuit for the relay 93 is broken only when the rotation of the shaft 58 by the index cylinder 62 has been completed. When this occurs, the relay 93 is de-energized and the contact 92 moves to its normally open position whereby the index solenoid 65 is de-energized. As a result of de-energization of the solenoid 65, the flow of fluid to the index cylinder 62 is reversed and the piston rod 61 is extended. Because of the design of the teeth on the ratchet wheel 59, there is no reverse movement of the shaft 58 by the pawl 60 during extension of the piston rod 61 from the index cylinder 62.

When the piston rod 61 of the index cylinder 62 has returned to its home position, the arm 90 again engages the switch 89 to close the normally open contact 99. If one of the trays 12 has still not been advanced to the loading position, the relay 93 is again picked and the indexing cycle repeated.

However, if the tray 12 has been advanced to the loading position, the normally closed switch 100 of the loading position contact 87 is opened. Since there are none of the articles 17 in the channel 16, the timer 75 is not energized whereby the normally open contact 77 is open. Accordingly, there can be no automatic picking of the relay 93 since the parallel circuits are open.

When one of the trays 12 is not disposed at the loading position, the automatic advancement of the tray 12 by the relay 93 being picked is only through the contact 100 of the switch 87. When one of the trays 12 is at the loading position, automatic indexing of the tray 12 is only through closing of the contacts 77 and 84 due to the photocells 28 and 79 not receiving light; this is when the channel 16 of the tray 12 is loaded with the articles 17 and is ready for indexing to present another of the empty channels 16 at the loading position.

Considering the operation of the present invention, it will be assumed that the only tray 12 on the support 10 is disposed at the right side of the support 10 and supported on the chains 47 and 48 for driving thereby. As a result, the switch 95, which is employed to indicate when the support 10 is filled with the trays 12 from the loading position to the left side of the support 10, is not actuated. Likewise, the loading position switch 87 is not actuated since no tray is disposed at the loading poston.

Accordingly, when the contacts 68 and 72 of the On-Off switch are closed, the relay 93 is picked because the contact 100 of the loading position switch 87 is closed due to the switch 87 not being actuated. Since the home index switch 89 is actuated due to the arm 90 on the piston rod 61 of the index cylinder 62 engaging the switch 89, the normally open contact 99 of the switch 89 is closed. Accordingly, a circuit is provided through the relay 93.

This results in the index solenoid 65 being energized because the contact 92 of the relay 93 is closed when the relay 93 is picked. The normally closed contact 94 of the switch 95 remains closed while the normally open contact 96 of the switch 97 is closed because the switch 97 is engaged and actuated by the arm 98 on the piston rod 43 of the control cylinder 42 due to the piston rod 43 being in its lowermost position.

When the index solenoid 65 is actuated, the piston rod 61 of the index cylinder 62 is retracted to cause rotation of the shaft 58 to advance the tray 12 toward the loading position. As soon as the piston rod 61 starts to retract, the arm 90 ceases to engage the contact 89 whereby the contact 99 is moved to its normally open position. This breaks the circuit to the relay 93 through the contact 100. However, the contact 102 of the relay 93 maintains the hold circuit for the relay 93 closed. The hold circuit for the relay 93 remains closed until the piston rod 61 of the index cylinder 62 has been fully retracted to completely advance the tray 12 the predetermined distance, which is the width of one of the channels 16. At this time, the arm 90 on the piston rod 61 engages the switch 104 to open the normally closed contact 103 of the switch 104 whereby the relay 93 is de-energized. As a result, the circuit to the index solenoid 65 is opened since the contact 92 opens due to the relay 93 de-energizing.

The flow of fluid to the index cylinder 62 is reversed when the solenoid 65 is de-energized. As a result, the fluid flows through the hose 64 into the cylinder 62 and is removed from the cylinder 62 through the hose 63. This returns the piston rod 61 to the position of FIG. 5. When the piston rod 61 of the index cylinder 62 returns to its home position, the arm 90 again engages the home index switch 89 to again close the normally open contact 99 whereby the relay 93 is again energized. These index cycles continue until the tray 12 is advanced to the loading position at which time the tray 12 actuates the loading position switch 87 to open the normally closed contact 100. Further advancement of the tray 12 due to the relay 93 being picked through the contact 100 is now prevented.

With the channel 16 in the tray 12 disposed at the loading position, the photocell 28 receives light from the lamp 29 through the opening 27 in the tray 12. As a result, the timer 75 is inactivated due to the relay 74 being de-energized whereby the normally open contact 77 of the timer 75 remains open. Thus, when the tray 12 reaches the loading position, automatic indexing of the tray 12 ceases.

With the index cylinder 62 in its home position, the normally open contact 88 of the home index switch 89 is closed. Likewise, the normally open contact 86 of the loading position switch 87 also is closed since the loading position switch 87 has been actuated due to the tray 12 being in the loading position. Furthermore, the normally closed contact 78 of the timer 75 is closed since the timer 75 is inactivated as previously mentioned.

Therefore, as soon as the index cylinder 62 returns to its home position and the tray 12 is disposed at the loading position, the gate solenoid 66 is automatically actuated. This results in the piston rod 43 being lifted due to the supply of fluid to the control cylinder 42 through the hose 45 and removal of fluid from the cylinder 42 through the hose 46 because of the position of the solenoid 66. As soon as the rod 43 starts to move upwardly, the normally open contact 96 of the switch 97 opens due to the arm 98 on the rod 43 no longer engaging the switch 97.

This insures that there can be no accidental energization of the index solenoid 65 when the control cylinder 42 has been actuated to raise the piston rod 43 upwardly.

As the rod 43 of the control cylinder 42 moves upwardly, the link 26 of the spring depressing means 25 is moved through an opening in the tray 12 and an opening in the retaining spring 23 to engage the actuating spring 24 whereby the retaining spring 23 drops to the solid line position of FIG. 3. Next, the blocking lever 38 is moved to the solid line position of FIG. 3 whereby the pins 41 block the lower end of the channel 16. Finally, the toggle gate 35 is rotated to open the passage 33 in the gate housing 34.

As soon as the toggle gate 35 ceases to block the gate housing passage 33, the articles 17 from the housing 37 flow uninterruptedly through the passage 33 into the channel 16. When the channel 16 is filled to the position at which the opening 27 in the tray 12 is blocked by one of the articles 17, light from the lamp 29 to the photocell 28 is blocked. This results in the timer 75 being activated for a sufficient period of time to cause the normally closed contact 78 of the timer 75 to open and then normally open contact 77 of the timer 75 to close. However, this does not de-energize the solenoid 66 or energize the relay 93. This is because the solenoid 66 remains energized through the normally closed contact 85 of the timer 82 and the circuit of the relay 93 remains open due to the normally open contact 84 of the timer 82.

However, shortly after the opening 27 is blocked, the articles 17 will have completely filled the passage 33 in the gate housing 34. As a result, light from the lamp 80 is blocked from the photocell 79. This causes the timer 82 to be activated whereby the normally closed contact 85 opens and the normally open contact 84 closes.

When the normally closed contact 85 opens, the solenoid 66 is de-energized. This results in the piston rod 43 of the control cylinder 42 being moved downwardly due to fluid being supplied to the cylinder 42 through the hose 46 and removed from the cylinder 42 through the hose 45.

As a result, the toggle gate 35 blocks the passage 33 in the gate housing 34 by engaging the adjacent edges of the articles 17 already disposed within the passage 33 in the gate housing 34. This insures that only the articles 17 beneath the toggle gate 35 can flow into the channel 16 when the pins 41 of the blocking lever 38 are removed from their blocking position.

As the piston rod 43 of the control cylinder 42 continues to move downwardly, the blocking lever 38 is moved to the dotted line position of FIG. 3 after the toggle gate 35 has been moved to the blocking position. Continued downward movement of the piston rod 43 of the control cylinder 42 pulls the link 26 of the spring depressing means 25 out of the tray 12. As a result, the actuating spring 24 moves the retaining spring 23 to the dotted line position of FIG. 3 whereby the articles 17 are retained within the channel 16. This mechanical arrangement is such that the articles 17 which are disposed above the retaining spring 23 and below the toggle gate 35 will have passed the retaining end of the retaining spring 23 before it moves to the dotted line position of FIG. 3.

Since the normally open contact 84 of the timer 82 closes when the contact 85 opens, the relay 93 is picked at the same time that the solenoid 66 is de-energized. However, the normally open switch 96 of the switch 97 is still open at this time because the piston rod 43 of the control cylinder 42 has not returned to its lowermost or home position. Therefore, even though the relay 93 is picked at the same time that the solenoid 66 is de-energized, there can be no energization of the index solenoid 65 to advance the tray 12 to dispose the next channel 16 at the loading position until the normally open switch 96 of the contact 97 is closed due to the arm 98 on the piston rod 43 of the control cylinder 42 engaging the switch 97. This occurs only after the retaining spring 23 and the blocking lever 38 are in the dotted line positions of FIG. 3 and the toggle gate 35 is blocking the passage 33 in the gate housing 34. Thus, there can be no inadvertent energization of the index solenoid 65.

As soon as the index cylinder 62 is energized, the normally open contact 99 of the home index switch 89 is moved to its open position. However, the hold circuit for the relay 93 continues until the contact 103 of the switch 104, which indicates full retraction of the piston rod 61 of the index cylinder 62, has been actuated by the arm 90 on the piston rod 61 of the index cylinder 62.

Accordingly, when the index cylinder 62 is energized, it advances the tray 12 a predetermined distance, which is the width of one of the channels 16, to position the next of the channels 16 at the loading position. Since the empty channel 16 does not have any of the articles 17 therein, the timer 75 is inactivated whereby the normally open switch 77 returns to its open position so that the relay 93 can not be again picked. Then, the cycle of energizing the solenoid 66, as previously mentioned, repeats.

The loading and indexing cycles continue until the support 10 is so filled with the trays 12 that further advancement of the trays 12 from right to left (as viewed in FIG. 1) would result in actuation of the switch 95. When this occurs, the normally closed contact 94 of the switch 95 is opened. As a result, no further automatic actuation of the index solenoid 65 is possible. Accordingly, there can be no additional automatic operation of the loading apparatus until one or more of the trays 12 is removed from the support 10.

Figure 7:
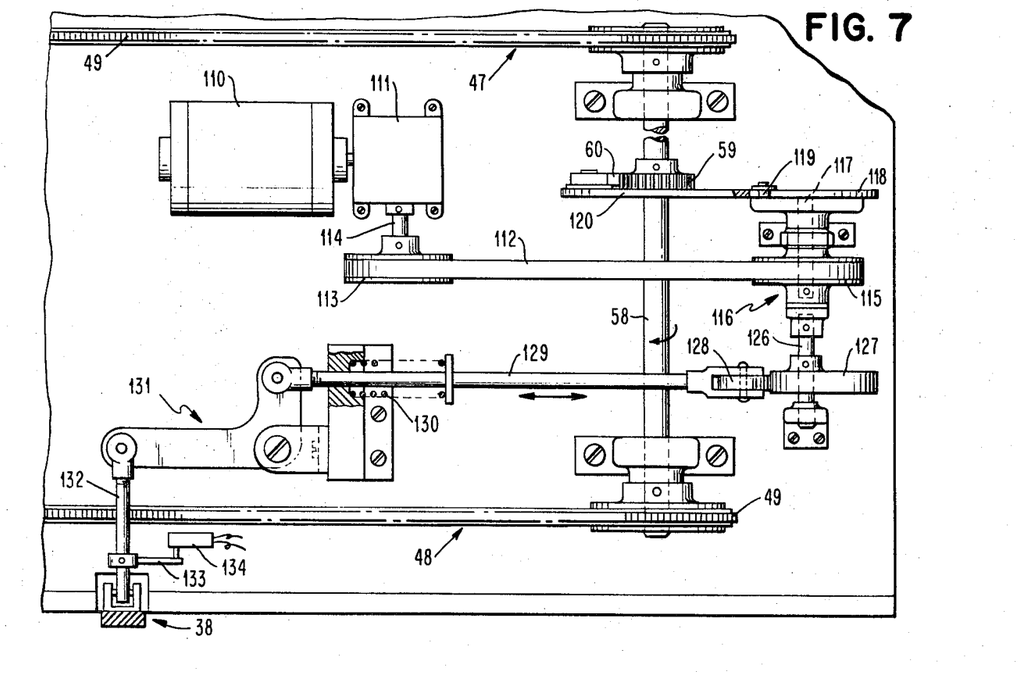
FIG. 7 is an elevational view, similar to FIG. 5, showing another embodiment in which an electro-mechanical drive is employed for controlling the indexing mechanism of the present invention.

Referring to FIG. 7, there is shown an electro-mechanical drive arrangement for indexing the tray 12 rather than the pneumatic arrangement of FIG. 5. The drive includes a motor 110 connected through a gear box 111 to rotate a belt 112. The belt 112 passes around a pulley 113 on a shaft 114 of the gear of the gear box 111 and a pulley 115 of a clutch 116.

When the clutch 116 connects the pulley 115 to a shaft 117, the shaft 58 is rotated by the pawl 60 engaging the teeth of the ratchet wheel 59 on the shaft 58. This results in the tray 12 being advanced or indexed in the same manner as described with respect to the apparatus of FIG. 5.

The shaft 117 carries a circular plate 118 thereon for rotation therewith. The circular plate 118 has a cam slot formed therein and extending around the circular plate 118 to receive a cam follower 119 on an arm 120, which carries the pawl 60. The arm 120 is mounted on the support 10 so that it can only slide to move the pawl 60 relative to the ratchet wheel 59.

Accordingly, during each revolution of the shaft 117, the pawl 60 is moved to rotate the shaft 58 and the pawl 60 is then returned to its starting or home position due to the design of the cam slot in the circular plate 118. Thus, each actuation of the clutch 116 causes rotation of the shaft 58 to advance the tray 12 the predetermined distance, which is the width of one of the channels 16 in the tray 12.

As long as an index solenoid 121 (see FIG. 8) is energized, the clutch 116 connects the pulley 115 to the shaft 117 whereby rotation of the motor 110 results in rotation of the shaft 58 during each revolution of the shaft 117. As a result, the tray 12 is continued to be advanced toward the loading position with each index cycle moving the tray 12 the width of one of the channels 16.

Figure 8:
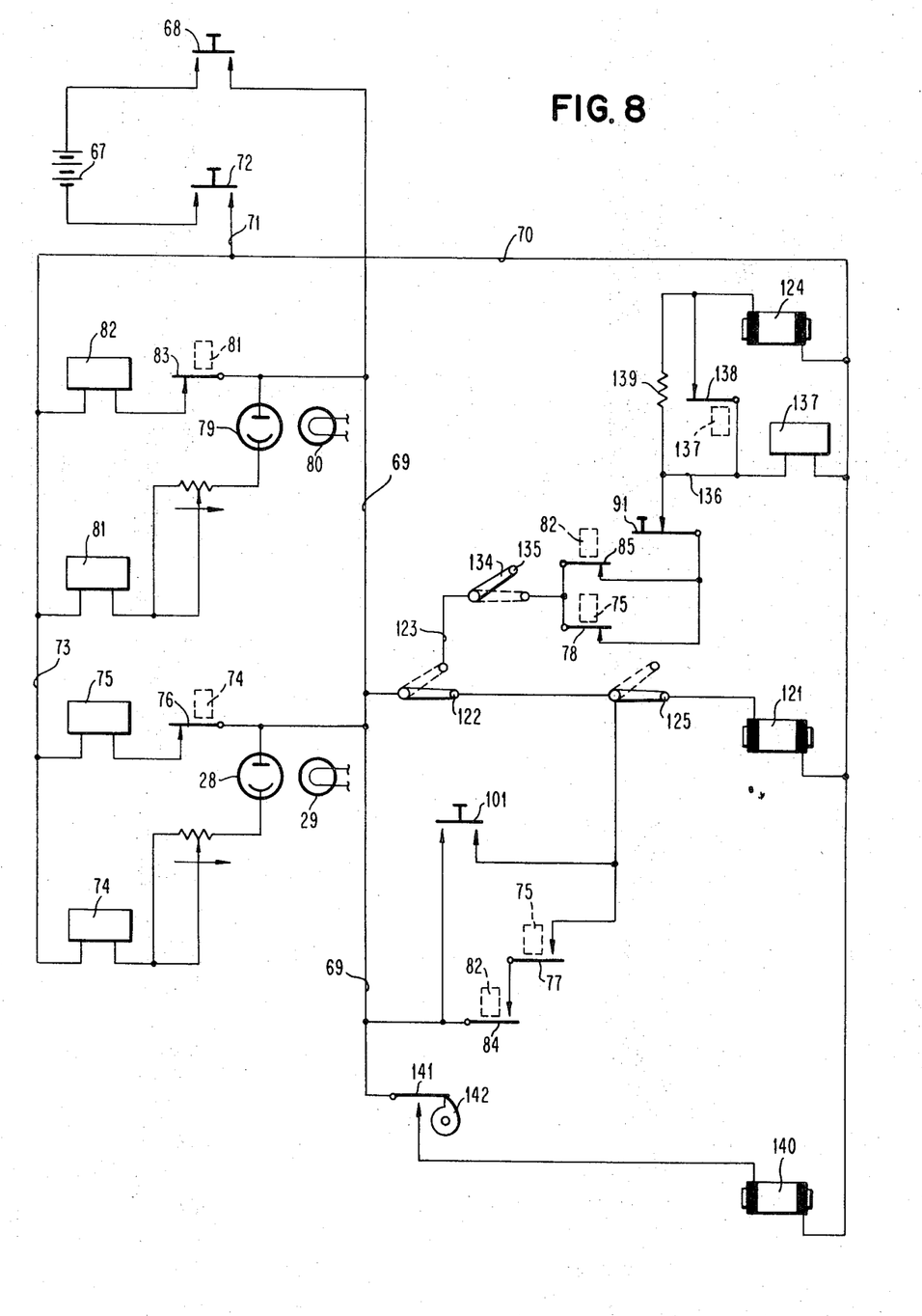
FIG. 8 is a schematic wiring diagram for automatically controlling the apparatus of the present invention when utilizing the electro-mechanical drive of FIG. 7.

When the tray 12 reaches the loading position, a contact 122 of a loading position switch, which is disposed at the same position on the support 10 as the loading position switch 87, is moved to connect the positive lead 69 with a lead 123 of a circuit for a gate solenoid 124, which controls the position of the toggle gate 35.

Thus, the index solenoid 121 continues to be energized until the tray 12 is disposed at the loading position. A contact 125 of a switch, which indicates the support 10 is loaded with the trays 12 and is similar to the switch 95, is disposed between the contact 122 and the index solenoid 121. However, when one of the trays 12 is being advanced to the loading position with no other tray on the support 10, the contact 125 is in its normally closed position.

When the index solenoid 121 is energized, the clutch 116 also connects the pulley 115 with a shaft 126 (see FIG. 7), which has a cam 127 mounted thereon. The surface of the cam 127 has a cam follower 128, which is mounted on the end of a link 129, biased into engagement therewith by a spring 130 acting on the link 129 whereby the follower 128 follows the surface of the cam 127.

Thus, when the pulley 115 is connected to the shaft 126, initial rotation of the cam 127 during each index cycle results in the link 129 being moved to the left (as viewed in FIG. 7) by the cam 127. This results in a bellcrank 131 pivoting counterclockwise (as viewed in FIG. 7) whereby a rod 132, which is connected to the bellcrank 131 and the blocking lever 38, moves downwardly. This moves the blocking lever 38 to the dotted line position of FIG. 3 wherein the blocking lever 38 does not block the channel 16.

When the rod 132 is moved downwardly, an arm 133 on the rod 132 ceases to engage a switch 134. As a result, a normally open contact 135 of the switch 134 is returned to its open position.

However, at the end of each revolution of the shaft 126, the rod 132 is returned to the position of FIG. 7 due to the cam 127 whereby the switch 134 is actuated. This again closes the switch 135 to indicate that the blocking lever 38 is again in its blocking position (solid line position of FIG. 3).

Thus, when the index solenoid 121 is de-energized due to the tray 12 being at the loading position, the switch 135 is closed. Accordingly, when the contact 122 is moved into engagement with the lead 123 due to the tray 12 being at the loading position, the positive lead 69 is connected to the parallel contacts 78 and 85 through the closed contact 135.

Since there are none of the articles 17 blocking the opening 27 in the tray 12, the contact 78 of the timer 75 is closed. Therefore, a circuit is completed to the negative lead 70 through a lead 136 and a relay 137 to the negative lead 70.

The lead 136 also connects through a normally closed contact 138 of the relay 137 to the gate solenoid 124. While the relay 137 is picked when the contact 122 engages the lead 123 with the contacts 135 and 78 closed, the normally closed contact 138 does not open for a few milliseconds after the relay 137 initially receives the large voltage pulse from the DC source 67. This is sufficient to allow the large voltage pulse from the DC source 67 to be applied to the gate solenoid 124. This large voltage is required to overcome the spring, which is holding the toggle gate 35 in the blocking position in the passage 33 in the gate housing 34.

However, as soon as the toggle gate 35 is moved to the position in which it does not block the passage 33, only a small voltage is required to hold the gate solenoid 124 energized. Therefore, the contact 138 ceases to allow the large voltage to be supplied to the gate solenoid 124 after the solenoid 124 has been picked since the contact 138 is opened due to picking of the relay 137. Then, the voltage is applied to the solenoid 124 through a resistor 139, which is sufficiently large to produce a relatively large voltage drop therethrough. As a result, only a small potential, which is all that is required to hold the gate solenoid 124 energized, is supplied to the gate solenoid 124 after it has been actuated.

The spring depressing means 25 is actuated in this embodiment through energization of a solenoid 140. Each energization of the solenoid 140 removes the link 26 from engagement with the actuating spring 24 to allow the retaining spring 23 to be moved to the dotted line position of FIG. 3.

As shown in FIG. 8, the solenoid 140 is connected between the positive lead 69 and the negative lead 70 through a movable contact 141, which is controlled by a cam 142. The cam 142 is mounted on the shaft 117 for rotation therewith.

Thus, during each revolution of the shaft 117 by the motor 110, the cam 142 causes energization of the solenoid 140 to withdraw the link 26 of the spring depressing means 25 from a position in which it blocks the advancement of the tray 12 before the tray 12 is advanced by the pawl 60. The cam 142 also is designed to open the circuit to the solenoid 140 so that the spring depressing means 25 has the link 26 returned into engagement with the actuating spring 24 after advancement of tray 12 by the pawl 60 has ceased but before the blocking lever 38 is returned to the solid line position of FIG. 3. Thus, the spring depressing means 25 moves the link 26 during each index cycle with the link 26 returned to the position in which it can engage the actuating spring 24 before the end of each index cycle.

When the tray 12 reaches the loading position with indexing of the tray 12 ceasing due to the contact 122 being moved into engagement with the lead 123, the spring depressing means 25 has the link 26 disposed in engagement with the actuating spring 24. This is because the link 26 returns into engagement with the actuating spring 24 before the end of the index cycle when the tray 12 was advanced to the loading position. Therefore, the retaining spring 23 is disposed in the solid line position of FIG. 3 before there is energization of the gate solenoid 124 or movement of the blocking lever 38 to the blocking position.

Additionally, the gate solenoid 124 cannot be actuated until the contact 135 of the switch 134 is moved to the closed position due to the switch 134 being engaged by the arm 133. Thus, the blocking lever 38 must be in its blocking position before the solenoid 124 can be energized.

Accordingly, the same sequence of operation of the various related elements occurs when the tray 12 is at its loading position as when the pneumatic arrangement of FIG. 5 is employed. That is, the retaining spring 23 is first moved to the solid line position of FIG. 3. (This occurs before the end of the index cycle.) Then, the blocking lever 38 is moved to the solid line position of FIG. 3 wherein it blocks the bottom end of the channel 16. (This occurs at the end of the index cycle.) Then, the toggle gate 35 is pivoted to open the passage 33 and allow the articles 17 to be supplied to the channel 16.

After loading of the channel 16 has been completed except for the portion of the channel 16 blocked by the blocking lever 38, the normally closed contact 78 opens and then normally closed contact 85 opens. The contact 78 opens first because the timer 75 is activated before the timer 82. The activation of the timer 75 occurs when the photocell 28 is not receiving light from the lamp 29 due to the blocking of the opening 27 by one of the articles 17. When both of the contacts 78 and 85 are open, the gate solenoid 124 is de-energized whereby the toggle gate 35 blocks the gate housing passage 33.

When the timers 75 and 84 are activated for the predetermined period of time, the normally open contacts 77 and 84 close. Again, the contact 77 of the timer 75 closes before the contact 84 of the timer 82. However, when both are closed, a circuit is completed through the contacts 84 and 77, the contact 125, and the index solenoid 121 whereby the index solenoid 121 is energized. This causes the clutch 116 to be actuated.

In the initial portion of rotation of the shafts 117 and 126 due to energization of the clutch 116, the cam follower 127 is rotated to pivot the bellcrank 131 counterclockwise (as viewed in FIG. 7) to move the blocking lever 38 out of the channel 16. When the rod 132 is moved downwardly away from the position in which the blocking lever 38 is in the solid line position of FIG. 3, the arm 133 ceases to engage the switch 134. This opens the contact 135 in the circuit of the gate solenoid 124.

Before the pawl 60 is effective to rotate the ratchet wheel 59, the cam 142 rotates sufficiently to close the contact 141 whereby the solenoid 140 is energized. This results in the link 26 of the spring depressing means 25 being removed from engagement with the actuating spring 24 whereby the retaining spring 23 is returned to the dotted line position of FIG. 3. The pawl 60 is effective to rotate the ratchet wheel 59 only after all of the foregoing operations have occurred. This is accomplished through properly controlling the shape of the cam slot in the circular plate 118.

When the channel 16 is loaded, except for the portion blocked by the blocking lever 38, the initial operation is to move the toggle gate 35 to block the passage 33. Then, the blocking lever 38 is removed to allow the articles 17, which are above the articles 17 blocking the opening 27 and below the toggle gate 35, to fall into the channel 16. Then, the retaining spring 23 is moved to the dotted line position of FIG. 3. Thus, the cam 142, which is mounted on the shaft 117, also must be properly controlled so that the spring depressing means 25 does not have the link 26 withdrawn before the channel 16 is completely filled but that the link 26 is withdrawn before indexing of the tray 12 occurs.

Considering the operation of the embodiment of FIGS. 7 and 8 in conjunction with the structure of FIGS. 1 to 3 with the pneumatic arrangement of FIG. 5 omitted in FIG. 3, it will be assumed that none of the trays 12 is on the support 10. Accordingly, when the contacts 68 and 72 of the On-Off switch are closed, the index solenoid 121 is automatically energized. This is because the contact 122 of the loading position switch connects the positive lead 69 with the normally closed contact 125. The contact 125 is open only when its switch, which is in the same position as the switch 95 in FIG. 1, indicates that any further advancement of the trays 12 would result in one of the trays 12 being pushed off of the support 10. This does not exist when only the single tray 12 is on the support 10 at the right side.

Therefore, the index solenoid 121 is energized to actuate the clutch 116. As a result, the blocking lever 38 is moved out of the blocking position, and then the link 26 of the spring depressing means 25 is moved out of the tray 12. Next, the pawl 60 rotates the ratchet wheel 59 to rotate the shaft 58. This results in the tray 12 being advanced the predetermined distance, which is equal to the width of one of the channels 16.

These index cycles continue until the tray 12 is disposed at the loading position. When this occurs, the contact 122 is moved from connection with the contact 125 and into contact with the lead 123. Because the blocking lever 38 is disposed in the blocking position at the end of any indexing cycle, the arm 133 on the rod 132 is in engagement with the switch 134. This causes the contact 135 to be closed.

Since none of the articles 17 is blocking the opening 27 in the tray 12, the contact 78 of the timer 75 is closed. Thus, a circuit is completed from the positive lead 69 through the contact 122, the lead 123, the closed contact 135, and the contact 78 to the lead 136. This results in picking of the relay 137.

The large voltage from the DC source 67 also is supplied momentarily through the contact 138 of the relay 137 to energize the solenoid 124. However, as soon as the relay 137 is picked and overcomes its inertia, the contact 138 opens. Then, the solenoid 124 is held open by current flowing through the resistor 139, which causes a large voltage drop. However, the voltage is sufficient to maintain the solenoid 124 energized.

When the solenoid 124 is energized, the toggle gate 35 is moved to open the passage 33 and allow the articles 17 to flow uninterruptedly from the housing 37 into the channel 16 in the tray 12. It should be understood that the retaining spring 23 was moved to the solid line position of FIG. 3 due to the de-energization of the solenoid 140 during the indexing cycle, which disposed the tray 12 at the loading position, but before the end thereof.

When the channel 16 has completely filled with the articles 17 except for the portion of the channel 16 blocked by the blocking lever 38, the opening 27 is blocked by one of the articles 17. This results in the timer 75 being activated; after a predetermined period of activation of the timer 75, the normally closed contact 78 opens and the normally open contact 77 closes. However, the contact 85, which is in parallel with the contact 78, remains closed until the timer 82 has been activated for a predetermined period of time. This occurs after the gate housing passage 33 is completely filled with the articles 17 to prevent light from the lamp 80 being supplied to the photocell 79.

When the timer 82 has been activated for the predetermined period of time, the normally closed contact 85 opens whereby the gate solenoid 124 is de-energized. This results in the toggle gate 35 being moved to block the passage 33 in the gate housing 34.

At the same time that the normally closed contact 85 opens to cause the toggle gate 35 to block the passage 33, the normally open contact 84 of the timer 82 closes. This produces a circuit from the lead 69 through the contacts 84, 77, and 125 and the index solenoid 121 to the negative lead 70. This results in energization of the index solenoid 121.

As a result of energization of the index solenoid 121, the clutch 116 is again actuated. The continuously rotating motor 110 drives the shafts 117 and 126 when the clutch 116 is actuated. The initial actuation of the shafts 117 and 126 results in the cam 127 being rotated to move the rod 132 downwardly whereby the blocking lever 38 is removed from the channel 16 to allow the remainder of the channel 16 to be filled with the stored articles 17, which are disposed above the top of the opening 27 and below the toggle gate 35. Then, the cam 142 on the shaft 117 is rotated sufficiently to energize the solenoid 140 to pull the link 26 away from the actuating spring 24. As a result, the retaining spring 23 moves to the dotted line position of FIG. 3 to retain the articles 17 within the filled channel 16.

Then, the pawl 60 is effective to rotate the shaft 58 to advance the tray 12. This is due to the arrangement of the cam slot in the circular plate 118.

After advancement of the tray 12 for the width of one of the channels 16 has been completed through the pawl 60 engaging the ratchet wheel 59, the continued rotation of the cam 142 moves the contact 141 to an open position to de-energize the solenoid 140. As a result, the link 26 of the spring depressing means 25 now returns into engagement with the actuating spring 24 of the empty channel 16, which has been advanced to the loading position. This automatically returns the retaining spring 23 to the solid line position of FIG. 3 to allow the articles 17 to easily flow into the channel 16.

Since the tray 12 is still at the loading position, the contact 122 has remained in engagement with the lead 123. Thus, there can be no energization of the index solenoid 121 through the contact 122.

Accordingly, when the empty channel 16 is advanced to the loading position, the timer 75 is deactivated since the opening 27 is no longer blocked by one of the articles 17. Accordingly, the switch 77 returns to its open position and no further actuation of the index solenoid 121 can occur.

At the completion of the indexing cycle, the contact 135 of the switch 134 is again closed due to the arm 133 engaging the switch 134. Thus, the normally open contact 135 is closed when the switch is engaged by the arm 133. This is when the rod 132 is moved upwardly to the position of FIG. 7. This is the position in which the blocking lever 38 blocks the channel 16.

Since the timer 75 has been deactivated due to the empty channel 16 being disposed at the loading position, the normally closed switch 78 is again closed. Accordingly, when the blocking lever 38 is in its blocking position as indicated by the normally open switch 135 being closed at the end of the index cycle, a circuit again is completed through the relay 137 and the contact 138 of the relay 137 whereby the solenoid 124 is energized. This again causes the toggle gate 35 to open the passage 33. As a result, the articles 17 begin to flow uninterruptedly into the empty channel 16 of the tray 12. The remainder of the cycle is as previously described.

An advantage of this invention is that articles may be rapidly loaded. Another advantage of this invention is that the area into which the articles are to be loaded is completely filled.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for loading articles into a channel or the like to completely fill the channel including:
   means adapted to be disposed in a position to prevent complete filling of the channel with articles when the channel is disposed at a loading position to receive an uninterrupted supply of articles;
   means to move said preventing means to an ineffective position after the remainder of the channel is filled to allow the unfilled portion to be filled;
   and means to advance the channel away from the loading position after the channel is filled.

2. The apparatus according to claim 1 including means to position the channel so that it may be filled by gravity.

3. An apparatus for loading articles into a channel or the like to completely fill the channel including:
   means adapted to be disposed in a position to prevent complete filling of the channel with articles when the channel is disposed at a loading position to receive an uninterrupted supply of articles;
   means to stop the uninterrupted supply of articles to the channel when the number of articles passing said stop means during the uninterrupted supply of articles to the channel is sufficient to completely fill the channel;
   said preventing means being disposed in an ineffective position upon the uninterrupted supply of articles being stopped by said stop means whereby the channel may be filled;
   and means to advance the channel away from the loading position after the channel has been filled.

4. The apparatus according to claim 3 including means to position the channel so that it may be filled by gravity.

5. An apparatus for loading articles into a channel or the like to completely fill the channel including:
   means adapted to be disposed in a position to prevent complete filling of the channel with articles when the channel is disposed at a loading position to receive an uninterrupted supply of articles;
   means to move said preventing means to an ineffective position after the remainder of the channel is filled to allow the unfilled portion to be filled;
   and said movable means including means to detect when the remainder of the channel is filled with said preventing means in its effective position.

6. An apparatus for loading articles into a channel or the like to completely fill the channel including:
   means adapted to be disposed in a position to prevent complete filling of the channel with articles when the channel is disposed at a loading position to receive an uninterrupted supply of articles;
   means to stop the uninterrupted supply of articles to the channel when the number of articles passing said stop means during the uninterrupted supply of articles to the channel is sufficient to completely fill the channel;
   means to determine when the number of articles passing said stop means is sufficient to completely fill the channel, said stop means being activated by said determining means;
   and said preventing means being disposed in an ineffective position upon the uninterrupted supply of articles being stopped by said stop means whereby the channel may be filled.

7. An apparatus for loading articles into a tray or the like having at least one channel or the like therein to be completely filled with the articles, said apparatus comprising:
   means to position the channel in the tray at a loading position to uninterruptedly receive articles;
   movable means to prevent complete filling of the channel during the uninterrupted supply of articles thereto;
   means to stop the uninterrupted supply of articles to the channel being filled when the remainder of the channel is filled;
   and said movable means being moved to an ineffective position in which said movable means does not prevent complete filling of the channel when said stop means is effective whereby the unfilled portion of the channel may be filled.

8. The apparatus according to claim 7 in which said positioning means advances the channel of the tray from the loading position after the channel is completely filled.

9. The apparatus according to claim 7 including means to dispose the tray so that the channel may be filled by gravity.

10. The apparatus according to claim 7 in which said positioning means disposes another of the channels in the tray at the loading position after the channel being loaded is completely filled.

11. The apparatus according to claim 7 including means to regulate the movement of said stop means and said movable means so that said movable means moves to its ineffective position only after said stop means stops the supply of articles.

12. The apparatus according to claim 10 including means to inactivate said positioning means after an empty channel is disposed at the loading position until the channel is completely filled.

13. An apparatus for loading articles into container means or the like having at least one channel or the like therein to receive articles uninterruptedly from a source with retaining means disposed at each end of the channel to retain the articles within the channel, said apparatus comprising:
   means to prevent complete filling of the channel in the container means with articles when the remainder of the channel is filled;
   means to move said preventing means to an ineffective position after the remainder of the channel is filled to allow the unfilled portion to be filled;
   and means to render the retaining means closest to the source of the articles ineffective until the channel is completely filled with the articles.

14. An apparatus for loading articles into container means or the like having at least one channel or the like therein to receive articles uninterruptedly from a source including:
   means to position the channel in the container means at a loading position;
   means to prevent complete filling of the channel in the container means with articles when the remainder of the channel is filled;
   means to stop the uninterrupted supply of articles from the source when the number of articles passing said stop means is sufficient to fill the channel;

and said preventing means being rendered ineffective upon said stop means being effective whereby the unfilled portion of the channel may be filled.

15. An apparatus for loading articles into container means or the like having at least one channel or the like therein to receive articles uninterruptedly from a source including:

means to prevent complete filling of the channel in the container means with articles when the remainder of the channel is filled;

means to stop the uninterrupted supply of articles from the source when the number of articles passing said stop means is sufficient to fill the channel;

means to determine when the number of articles supplied is sufficient to fill the channel, said determining means actuating said stop means;

and said preventing means being rendered ineffective upon said stop means being effective whereby the unfilled portion of the channel may be filled.

16. The apparatus according to claim 14 in which:

the container means has a plurality of substantially parallel channels therein;

said positioning means includes means to index the container means after each channel is filled to position an empty channel for filling;

and said preventing means is disposed in its effective position before said stop means is rendered ineffective.

17. The apparatus according to claim 14 in which the container means is disposed so that the articles may be gravity fed to the channel.

18. The apparatus according to claim 14 in which said preventing means comprises a pivotally mounted member adapted to be disposed within the channel receiving articles in its effective position to prevent complete filling of the channel.

19. The apparatus according to claim 14 in which: said stop means includes:

a pivotally mounted member blocking the flow of articles to the channel;

and means to actuate said pivotally mounted member.

20. The apparatus according to claim 19 in which said actuating means includes means to detect when the remainder of the channel is filled with articles with said preventing means in its effective position.

21. The apparatus according to claim 19 including means to render said preventing means ineffective after said pivotally mounted member of said stop means prevents the flow of articles to the channel.

22. The apparatus according to claim 16 including:

means to support the container means thereon for movement by said index means;

and means to inactivate said index means when said support means cannot support any additional loaded channels in the container means.

23. An apparatus for loading articles into container means or the like having at least one channel or the like therein to be completely filled with the articles including:

means to position the channel in the container means at a loading position;

means to uninterruptedly supply articles to the channel from a source when the channel is at the loading position;

movable means to prevent complete filling of the channel in the container means with articles from said supply means;

means to stop the uninterrupted supply of articles to the channel from said supply means when the articles passing said stop means during the uninterrupted supply of articles to the channel is sufficient to completely fill the channel;

and means to move said movable means to a position in which the unfilled portion of the channel may be filled, said moving means being actuated only when the supply of articles to the channel from said supply means is stopped by said stop means.

24. An apparatus for loading articles into container means or the like having at least one channel or the like therein to be completely filled with the articles including:

means to uninterruptedly supply articles to the channel from a source;

movable means to prevent complete filling of the channel in the container means with articles from said supply means;

means to stop the uninterrupted supply of articles to the channel from said supply means when the articles passing said stop means during the uninterrupted supply of articles to the channel is sufficient to completely fill the channel;

means to determine when the articles passing said stop means during the uninterrupted supply of articles to the channel from said supply means is sufficient to completely fill the channel, said determining means actuating said stop means;

and means to move said movable means to a position in which the unfilled portion of the channel may be filled, said moving means being actuated only when the supply of articles to the channel from said supply means is stopped by said stop means.

25. The apparatus according to claim 23 including means to move said stop means to a position to allow supply of articles from said supply means only when one of the channels is disposed at the loading position by said positioning means to receive the articles from said supply means.

26. The apparatus according to claim 23 in which:

the container means has a plurality of substantially parallel channels therein;

said positioning means includes means to index the container means after each channel is filled to position an empty channel for filling;

and said movable means is disposed in its preventing position before said stop means is rendered ineffective.

27. The apparatus according to claim 26 in which each of the channels in the container means has means disposed at each end thereof to retain the articles within the channel including means to render the retaining means closest to said supply means ineffective until the channel is completely filled with the articles.

28. The apparatus according to claim 27 in which said rendering means is effective for each of the channels only when the channel is disposed at the loading position by said positioning means.

References Cited

UNITED STATES PATENTS

| 2,585,558 | 2/1952 | Lakso. | |
|---|---|---|---|
| 2,656,962 | 10/1953 | Daniels. | |
| 2,855,737 | 10/1958 | Chase et al. | 53—59 |

TRAVIS S. McGEHEE, Primary Examiner

U.S. Cl. X.R.

53—78, 160, 246